United States Patent [19]
Greenspan

[11] Patent Number: 4,749,416
[45] Date of Patent: Jun. 7, 1988

[54] IMMERSION PYROMETER WITH PROTECTIVE STRUCTURE FOR SIDEWALL USE

[75] Inventor: David C. Greenspan, Vienna, Va.

[73] Assignee: System Planning Corporation, Arlington, Va.

[21] Appl. No.: 891,992

[22] Filed: Aug. 1, 1986

[51] Int. Cl.[4] .................................. H01L 35/02
[52] U.S. Cl. .................................. 136/232; 136/234
[58] Field of Search .................. 374/139, 149, 179; 136/230, 234, 242, 233, 232

[56] References Cited

U.S. PATENT DOCUMENTS

| | | | |
|---|---|---|---|
| 2,843,646 | 7/1958 | Conant | 374/140 X |
| 3,061,482 | 10/1962 | Grant | 148/6 |
| 3,106,493 | 10/1963 | Japka | 136/234 X |
| 3,250,125 | 5/1966 | Bonn | 374/140 |
| 3,537,911 | 11/1970 | Hynd | 136/234 X |
| 3,580,744 | 5/1971 | Inouye et al. | 136/234 |
| 3,647,559 | 3/1972 | Truppe et al. | 136/234 |
| 3,913,058 | 10/1975 | Nishio et al. | 374/144 X |
| 3,960,604 | 6/1976 | Heitzinger et al. | 136/233 X |
| 3,990,860 | 11/1976 | Fletcher et al. | 428/404 |
| 4,216,028 | 8/1980 | Kurita | 136/234 |
| 4,390,290 | 6/1983 | O'Neill et al. | 374/179 X |
| 4,430,518 | 2/1984 | Nakajima et al. | 136/234 |

Primary Examiner—Daniel M. Yasich
Attorney, Agent, or Firm—Pollock, Vande Sande & Priddy

[57] ABSTRACT

Temperature sensing apparatus for use in the sidewall or bottom of a vessel for containing molten metal. A temperature sensing element is mounted within a sheath which is provided with a sacrificial coating to protect the sheath from premature oxidation such as may occur during a gas-flame pre-heat cycle. The sheath which is being protected against premature oxidation by the sacrificial coating is a composite of a closed end metal tube and a plurality of porous cermet layers of aluminum oxide-chromium oxide-molybdenum with the concentration of molybdenum decreasing in proceeding from the inner cermet layer to the outer cermet layer. The outer cermet layer of the sheath is covered by a ceramic layer of aluminum oxide. The sacrificial coating consists of a layer of zirconium oxide in combination with and covered by a layer of fibrous alumina. The sacrificial coating is typically destroyed by the end of a pre-heat cycle.

8 Claims, 2 Drawing Sheets

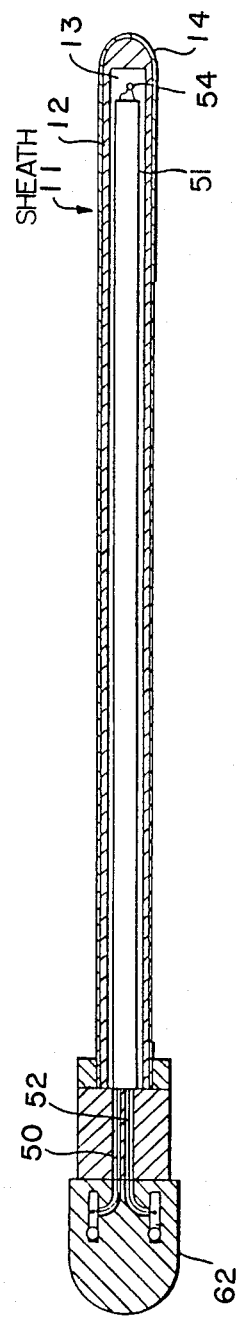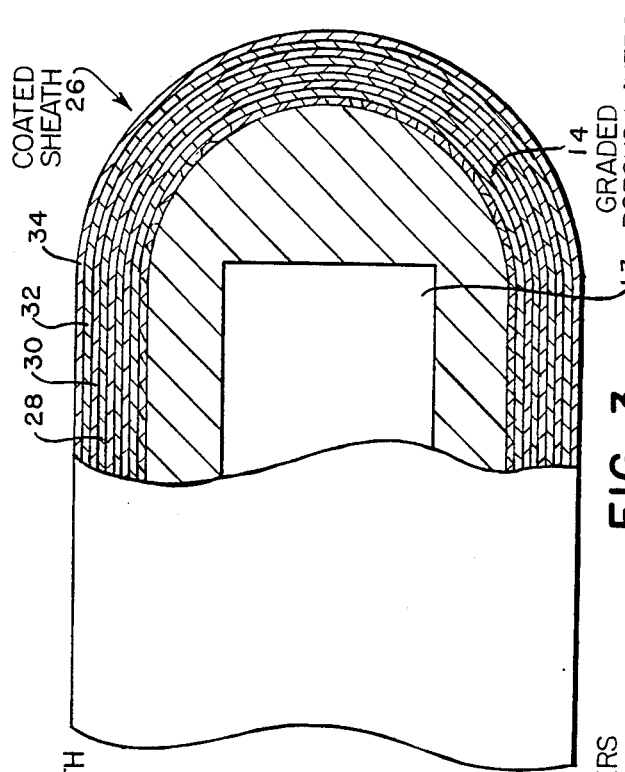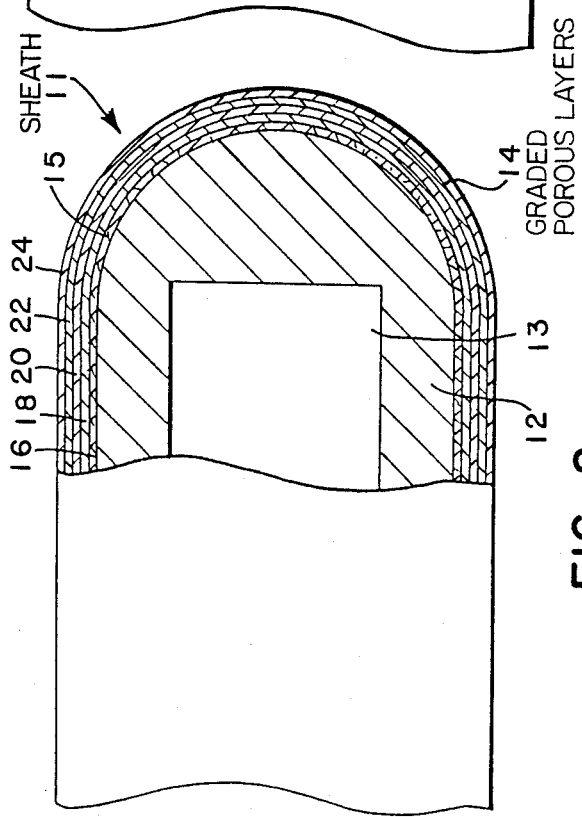

IMMERSION PYROMETER WITH PROTECTIVE STRUCTURE FOR SIDEWALL USE

BACKGROUND OF THE INVENTION

This invention relates to immersion pyrometers and more particularly to structures for protecting temperature sensing elements in pyrometers used to measure the temperatures of molten metals.

Many industrial and scientific processes require the measurement and control of extremely high temperatures. For example, measurements of the temperature of molten metals are essential to proper process control in the metal processing industry. Two of the most common instruments used to determine the temperatures of molten metals are the optical pyrometer and the disposable lance thermocouple. However, each of these devices has its disadvantages. The optical pyrometer is not as accurate as is desirable, and can only measure the surface temperature of the molten metal. The disposable lance thermocouple is inaccurate, does not permit continuous measurement of the temperature of the molten metal, and its use involves some safety problems for the person using it.

As a result of the shortcomings of the optical pyrometer and the disposable lance thermocouple, considerable effort has been expended in developing an immersion pyrometer which has a long-term continuous reading capability. In one type of an immersion pyrometer, a thermocouple junction is encased in a tube made of a metal with a high melting temperature which is coated with a ceramic, such as $Al_2O_3$ or a mixture of $Al_2O_3$ and $Cr_2O_3$ which protects the metal tube from the molten metal environment. However, in use the ceramic layer or layers tends to spall and permit molten metal to contact the metal substrate and attack it. The inner metal tube cannot withstand attack by the slag and/or the molten metal and it, together with the sensing element enclosed therein is quickly destroyed. The sensing element, usually a noble metal thermocouple, is expensive and it is desirable to be able to reuse it many times. However, structures which have been designed to protect the thermocouples have resulted in a slow thermal response, making them substantially ineffective for many purposes.

U.S. patent application Ser. No. 775,183, filed Sept. 12, 1985, now U.S. Pat. No. 4,721,534 for IMMERSION PYROMETER describes a protective sheath for a thermocouple which is capable of withstanding severe thermal shock and which exhibits good resistance to corrosion and erosion by molten metals. While this sheath has an service life which is relatively long, it is desirable to increase the service life even further. It is especially desirable to increase the ability of a pyrometer to withstand a preheat cycle in an oxidizing atmosphere, and to mount the sheath in a fixed position so that it remains in molten metal and out of contact with slag throughout the vessel campaign.

SUMMARY OF THE INVENTION

It is accordingly one object of this invention to provide means for protecting a temperature sensing device which enables it to be used for extended periods of time in a molten metal environment.

It is another object of this invention to provide apparatus for protecting a thermocouple which will be resistant to thermal shock and be capable of withstanding successive cycles of rapid heating and cooling.

It is still another object of this invention to provide a temperature measurement system for installation in the sidewall or the bottom of a vessel for containing molten metal.

In accordance with this invention there is provided a temperature sensing apparatus comprising a combination of a temperature sensing element; a sheath enclosing said temperature sensing element, said sheath comprising: a closed end metal tube; a plurality of protective layers covering said metal tube, said protective layers comprising at least two cermet layers consisting of aluminum oxide-chromium oxide-molybdenum, the concentration of molybdenum in said cermet layers decreasing in proceeding from the inner to the outer layers, and a ceramic layer of substantially pure aluminum oxide-chromium oxide covering the outermost cermet layer, each of said cermet layers and said ceramic layer having a porosity of from about 4% to about 33%; and a coating on said sheath comprising sacrificial outer lamellae comprising a layer of zirconia covered by a layer of fibrous alumina.

The temperature sensing apparatus of this invention is well-adapted for installation in a sidewall or bottom of a tundish, and these locations permit the length of the instrument, and thus the cost, to be reduced. Further, the shorter instrument reduces the forces produced on the system by molten metal. A sidewall or bottom mounting facilitates instrumentation and leaves the top of a tundish unencumbered by extraneous wires and fixtures. In addition, the position of the thermocouple junction can be known beforehand which allows for improved accuracy in extrapolating temperatures in other regions of a melt. There is direct contact between the coated sheath and the molten metal which provides for rapid transfer of heat and thus a fast response time.

BRIEF DESCRIPTION OF THE DRAWINGS

FIG. 1 is a sectional view of a sheath showing a thermocouple disposed therein;

FIG. 2 is a sectional view of an embodiment of a sheath having protective cermet and ceramic layers;

FIG. 3 is a section view of a sheath showing the outer sacrificial lamellae over the cermet and ceramic layers of the sheath.

DESCRIPTION OF THE PREFERRED EMBODIMENT

Figure 4:
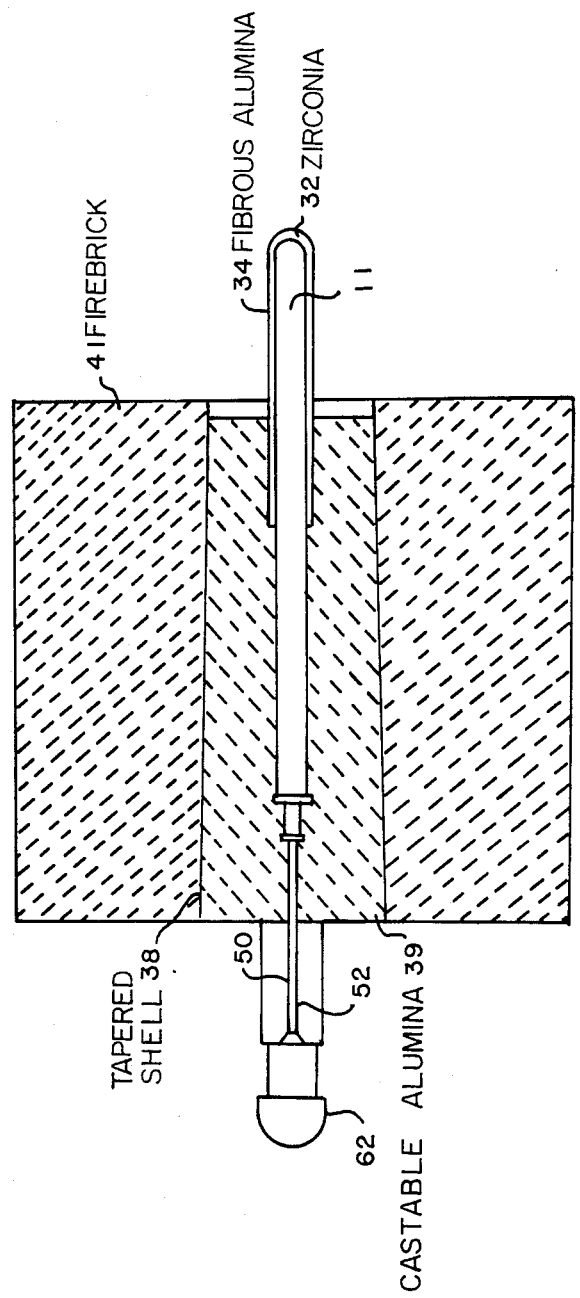
FIG. 4 is a sectional view of a coated sheath mounted in a firebrick for insertion in the sidewall or bottom of a vessel.

As shown in FIG. 1, closed-end metal tube 12 defines cavity 13 which contains thermocouple junction 54. Thermocouple wires 50 and 52 interconnect terminal head 62 with termocouple junction 54 and are held in place in sheath 11 by double-bore insulation, 51. Terminal head 62 may be provided with seals, not shown.

The metal tube 12 is formed by methods known in the art from a metal or metal alloy which has the requisite properties of a high melting point and high strength at elevated temperatures. Molybdenum is the metal of choice for use at extremely high temperatures in view of its excellent mechanical properties at elevated temperatures. The thermal conductivity and specific heat of the metal of the tube control the temperature rise in the interior of the tube and the result is a benign environment for the thermocouple assembly. Molybdenum containing minor amounts of titanium and zirconium may be used, and the resulting alloy has the advantage that its use results in a stronger tube than a tube made of pure molybdenum because the alloy tends to inhibit recrystallization at the temperatures of interest.

Tubes made of stainless steel are quite satisfactory for use as the inner sheath or as a component of the inner sheath when the temperatures of lower melting materials, such as, for example, aluminum or brass are to be measured. Stainless steel has a cost advantage when compared to molybdenum and in some instances may be the metal of choice for the tube for that reason. Although, as noted above, metals other than molybdenum or molybdenum alloys may be used for the tube, in the following description the tube will be identified as a molybdenum tube. It is not intended that this should limit the invention, and persons skilled in the art will be able to substitute other suitable materials for molybdenum.

Although molybdenum has an extremely high melting temperature, it will readily oxidize at high temperatures. Molybdenum is also attacked by the chemically aggressive gases that are present in the vicinity of a metal melt. For these reasons a protective coating must be used to protect the molybdenum tube from the environment.

In accordance with the invention, and as described in co-pending application Ser. No. 775,183, for "Immersion Pyrometer", filed Sept. 15, 1985, the molybdenum tube is protected from the environment by a coating comprising a plurality of porous layers of a cermet, alumina-chromiamolybdenum, which are applied to the outer surface of the tube as by an arc plasma spray process all the separate layers which make up the protective coating 14, as depicted in FIGS. 2 and 3, are not shown in FIG. 1.

It is common practice when applying ceramic coatings to substrates, such as those made of ceramic or metal, to match the coefficients of thermal expansion of the substrate and the coating material in order to minimize the thermal stresses arising from temperature changes which will weaken and ultimately destroy the coatings. To match the coefficients of thermal expansion of the coatings with the substrate materials, however, severely limits the choice of materials which can be used effectively for coatings. In the present invention, advantage is taken of mismatches of thermal expansion between the ceramic and the molybdenum to produce a controlled thermal mechanical stress which induces fine, well-controlled microcracking in the coating. This microcracking which is represented in FIG. 2 by numeral 15, together with the proper amount of porosity in the coating layers, results in a protective shield having superior thermoshock resistance as well as excellent chemical durability in hostile environments.

The porous layers of a cermet comprising alumina-chromiamolybdenum may be applied directly to the outer surface of metal tube 12 which has preferably been roughed, as by grit blasting, to improve adhesion of the protective coating. However, in the preferred method of carrying out the invention, the outer surface of metal tube 12 is first coated with a porous layer of molybdenum 16 formed from molybdenum powder as by arc plasma spraying the powder onto the surface of tube 12.

FIG. 2 illustrates the structure of the resulting graded protective coating 14 which consists of a porous molybdenum bond coat 16 followed by porous cermet coats 18, 20 and 22 which contain a mixture of alumina-chromia-molybdenum, with the molybdenum present in decreasing concentrations in the layers in proceeding from the inner to the outer layer. The outer coat 24 is substantially 100% alumina-chromia.

The alumina-chromia may suitable contain chromia in a concentration from about 10 to about 30 mole %, and the preferred alumina-chromia powder contains chromia in the amount of about 20 mole %. $Al_2O_3$-$Cr_2O_3$ containing about 20 mole % chromia has a thermal coefficient of expansion of about 8 parts per million per degree Centigrade.

The molybdenum has a thermal coefficient of expansion of approximately 5.4 parts per million per degree Centigrade which results in a 45% difference in the thermal coefficients of expansion of the ceramic and the molybdenum.

While the alumina and the chromia may be prepared by mechanically blending alumina and chromia powder, the preferred material is a powder which has been fully reacted by secondary firing.

In the preferred form of the sheath, the first porous layer which is adjacent the molybdenum substrate is formed from molybdenum powder. Subsequent layers have a decreasing concentration of molybdenum and an increasing concentration of ceramic, and the outer layer is 100% ceramic. While the extent of the changes made in the compositions in proceeding from one layer to another is not critical, in the preferred method of carrying out the invention, the change in the concentration of molybdenum is a straight line volume percent relationship in proceeding from the inner to the outer layers.

While the number of layers of the cermet may range from 2 to 10 or more, and preferably from 3 to 9, little advantage is gained by going beyond about 5 layers and the cost of making the inner sheath increases with the number of layers used. In the preferred method of making the sheath, the graded protective coating 14 consists of five layers starting with 100% molybdenum for the first layer, 75%-25% ceramic for the second layer, 50% molybdenum - 50% ceramic for the third layer, 25% molybdenum - 75% ceramic for the fourth layer, and 100% ceramic for the fifth layer.

The total thickness of the various layers may suitably range from about 0.020 inch to about 0.040 inch. In the preferred method of carrying out the invention, the porous molybdenum layer adjacent the molybdenum tube and each successive porous cermet layer has a thickness from about 0.002 inch to about 0.004 inch, and the outer ceramic coat has a thickness from about 0.015 inch to about 0.025 inch. Very close control of the thicknesses of the various layers is not essential in order to produce an inner sheath which is resistant to thermal shock. However, in the preferred method of carrying out the invention, each of the layers of molybdenum and cermet has approximately the same thickness, for example about 0.003 inch.

It is essential that the cermet layers have a porosity of from about 4 to about 33%. The preferred range of porosity is from about 15-30% and the optimum is from about 20-25%. While the function of the pores is not fully understood, it is believed that the pores accommodate the expansion of the material in the layers when subjected to a high temperature environment. The values for porosity given herein are as determined by optical microscopy using standard stereological techniques.

The preferred method of achieving the desired porosity is by applying the molybdenum, cermet and ceramic layers by a plasma arc process. Such a process has been found to be particularly useful because it permits control of the critical parameters of surface structure and porosity of the layers. The degree of porosity of a metal, cermet or ceramic layer deposited in a plasma spray coating process primarily is determined by the magnitude of the process parameters of (1) power input to the arc, (2) powder feed rate, (3) the distance from and the angle to the substrate surface of the spray nozzle, and (4) the rate of traverse of the spray nozzle over the substrate surface.

The power may suitably range from about 15 to about 45 KW and the preferred level of power input is from about 30 to about 40 KW. A decrease in the power input results in a increase in the porosity of the coated layer.

The powder feed rate may be in the range from about 6 pounds to about 10 pounds of powder per hour. A decrease in the powder feed rate decreases the porosity of the coated layer.

The spray nozzle is preferably held a distance of from about 2 inches to about 6 inches away from the substrate surface. The porosity of the coated layer increases with an increase in the distance between the spray nozzle and the substrate.

The angle that the sprayed particles make with respect to a line perpendicular to the axis of the body being sprayed may be as great as 30%; however, the preferred angle is about 0° to about 10°. As the angle of impact is increased, the porosity increases. The traverse rate of the spray nozzle along the substrate surface may suitably range from about 4 inches to about 12 inches per second. The porosity increases as the traverse rate increases.

In the preferred method, the substrate is rotated as it is sprayed. A typical rate of rotation is about 600 revolutions per minute for a ½ inch tubular substrate.

In carrying out the coating process, the substrate should be heated, preferably to a temperature in the range of about 200° F. to about 500° F. While a change in the substrate temperature may change the degree of porosity to some extent, the effect appears to be minor.

The type and force of plasma gases also have little effect on controlling the degree of porosity. Useful gases are a mixture of nitrogen and hydrogen in the volume ratio of nitrogen to hydrogen of from about 4:1 to about 8:1. Typically useful flow rates are 2.5 standard cubic feet to 5 standard cubic feet per minute for nitrogen and 0.3 standard cubic feet to 0.6 standard cubic feet per minute for hydrogen.

Vessels for holding molten metals may go through a gas-flame preheat cycle with no metal in the vessel, and if no protective covering for the sheath is present, the oxidizing effect of the gas flame could deteriorate the sheath and shorten the service life in the melt. In order to protect the cermet and ceramic layers, and as shown in FIGS. 3 and 4, the outer portion of the sheath is coated with sacrificial lamellae comprising an inner layer 32 of a zirconium oxide castable and a covering layer 34 of fibrous aluminum oxide.

The thickness of these layers is not critical and a layer about 0.1 inch thick is suitable. After application of the zirconia and alumina covering layer, the resulting coated sheath 26 is baked at about 400° F. for about 12 hours.

This system can withstand long immersion at elevated temperatures because the sheath 11 is not damaged by a preheat cycle and is not exposed to a slag layer. The sacrificial lamellae 32 and 34 are typically destroyed by the end of the preheat cycle, but by that time, they are no longer needed.

In a preferred method of carrying out this invention, at least one layer of boron nitride is provided between the ceramic layer 24 of graded layers 14 and the sacrificial lamellae 32, 34. FIG. 3 shows boron nitride as layers 28 and 30. The boron nitride may be applied by spraying an aqueous suspension of boron nitride onto the ceramic coat at room temperature, air drying the coat and then curing it at a temperature of about 700° F. In the preferred method of applying a boron nitride overcoat, a plurality of thin coats is applied with air drying between each coat, and the final coated body is cured at a temperature of about 700° F. For example, five (5) coats, each 0.002 inch thick may be used to attain a total boron nitride coat thickness of 0.01 inch. Suitable aqueous suspensions of boron nitride containing an inorganic binder such as alumina, are commercially available.

In the preferred method of using boron nitride in carrying out the invention, at least two layers of boron nitride are applied over the outer coating of the porous graded layers with an intermediate layer of $Al_2O_3$-$Cr_2O_3$ between the layers of boron nitride. The coats may be applied by first spraying a suspension of boron nitride over the $Al_2O_3$ topcoat to form a thin layer of boron nitride on the $Al_2O_3$-$Cr_2O_3$ layer. The boron nitride coat is air-dried and cured and then, a thin layer of $Al_2O_3$-$Cr_2O_3$ is plasma arc sprayed over the boron nitride. As discussed below, the boron nitride coat is treated to condition it so that the subsequent coat of plasma arc-sprayed $Al_2O_3$-$Cr_2O_3$ will adhere to it. This step is followed by applying another layer of boron nitride. As many coats as deemed necessary can be added this way. The boron nitride apparently permits the adjacent ceramic layers to move longitudinally as they expand, producing slip plane effects which induce no major stresses in the adjacent ceramic layers. As the outer coats deteriorate due to their erosion in the melt, the inner coats assume the task of protection. This process continues until the sacrificial coat has worn away, and after the sacrificial layers are gone, the protective sheath still functions with its basic porous graded layers intact.

Other materials, such as $Al_2O_3$-$Cr_2O_3$ do not adhere well to a substrate of boron nitride unless the boron nitride layer has been treated to increase adherence between the layers. In one such treatment, the layer of boron nitride is provided with a layer of wet boron nitride and $Al_2O_3$-$Cr_2O_3$ powder is brushed onto the wet boron nitride layer. $Al_2O_3$-$Cr_2O_3$ is then plasma arc sprayed onto the resulting substrate. This procedure may be followed to coat each layer of $Al_2O_3$-$Cr_2O_3$ onto a boron nitride layer.

The technique described above results in a system which can withstand long immersions because it protects the graded coats.

The life of a thermocouple probe can be extended even further by lining the interior of the metal tube 12 with a closed-end ceramic tube (not shown) and installing the thermocouple inside the ceramic tube. The advantage of this structure is the protection afforded the thermocouple even if the melt reaches and attacks the inner metal tube. While the ceramic tube will not withstand rough handling or additional immersions due to direct thermal shock after the inner metal tube 12 dissolves in the melt, it can survive for long periods in certain melts.

FIG. 4 shows the thermocouple assembly with its sacrificial lamellae of zirconia 32 and fibrous alumina 34 mounted in tapered tubular shell 38 which is in turn mounted within firebrick 41. The thermocouple assembly is secured in position in tubular shell 38, which is preferably made of stainless steel, by alumina castable 39 which is placed in the shell around the thermocouple and baked at a temperature of 400° F. to 675° F. for 12 to 40 hours. The firebrick 41 is installed in a sidewall or bottom of a vessel using techniques well-known in the art, and electrical connections are made to terminal head 62.

What is claimed is:

1. Temperature sensing apparatus comprising:
    a temperature sensing element;
    a sheath for enclosing said temperature sensing element, said sheath comprising a closed end metal tube, a plurality of protective layers covering said metal tube, said protective layers comprising at least two cermet layers consisting of aluminum oxide-chromium oxide-molybdenum, the concentration of molybdenum in said cermet layers decreasing in proceeding from the inner to the outer layers, and a ceramic layer of substantially pure aluminum oxide-chromium oxide covering the outermost cermet layers, each of said cermet layers and said ceramic layer having a porosity of from about 4 percent to about 33 percent; and
    Sacrificial outer lamella covering at least a portion of said sheath, said lamella comprising a layer of zirconia in combination with and covered by a layer of fibrous alumina, thereby protecting said sheath from premature oxidation.

2. Temperature sensing apparatus in accordance with claim 1 wherein said sheath contains at least one layer of boron nitride.

3. Temperature sensing apparatus in accordance with claim 1 wherein said sheath and said sacrificial outer lamella are separated by a layer of boron nitride.

4. Temperature sensing apparatus in accordance with claim 1 secured within a tubular shell by a castable refractory, and said tubular shell is mounted within a refractory brick.

5. Temperature sensing apparatus in accordance with claim 4 wherein said tubular shell is tapered and is made of stainless steel.

6. Temperature sensing apparatus in accordance with claim 1 wherein the closed end metal tube is lined with a ceramic sleeve.

7. Temperature sensing apparatus in accordance with claim 1 wherein the closed end metal tube comprises molybdenum.

8. Temperature sensing apparatus in accordance with claim 1, wherein the metal tube is made of stainless steel.

* * * * *